W. G. BLODGETT.
FISH HOOK.
APPLICATION FILED MAR. 23, 1914.

1,183,527.

Patented May 16, 1916.

Witnesses:

Inventor:
William G. Blodgett
By Oliphant & Young
Attorneys

UNITED STATES PATENT OFFICE.

WILLIAM G. BLODGETT, OF MILWAUKEE, WISCONSIN.

FISH-HOOK.

1,183,527.

Specification of Letters Patent.

Patented May 16, 1916.

Application filed March 23, 1914. Serial No. 826,684.

*To all whom it may concern:*

Be it known that I, WILLIAM G. BLODGETT, a citizen of the United States, and resident of Milwaukee, in the county of Milwaukee and State of Wisconsin, have invented certain new and useful Improvements in Fish-Hooks; and I do hereby declare that the following is a full, clear, and exact description thereof.

My invention has for its object to provide a simple, economical and effective fish-hook especially designed for trolling or casting.

The construction and arrangement of my invention is such that a spring-controlled hook is attached to a body and locked under compression in such manner that when a "strike" occurs the bite of the fish causes release of the spring-controlled hook member, whereby the same is spread or expanded to thus positively gaff the inner surface of the fish's mouth at two points simultaneously, whereby the catch is insured. This automatic hooking of the fish coincident to the bite will avoid the delicate manipulation and skill ordinarily required to hook the fish by an initial tightening of the line at a critical time, which frequently results in losing the prospective catch due to the fact that the hook will not take hold or be so slightly embedded into the flesh that any sudden jerk will cause release. The catch or hooking will hence be automatic and at all times the force applied is uniform.

Another object of my invention is to provide means whereby the points of the hooks are concealed or protected during a trolling or casting operation, whereby the device is rendered weedless.

As an exemplification of my invention I have shown the same in connection with an artificial minnow having a hollow body provided with a whirl or spoon, but it should be understood that any form of bait may be utilized without departing from the spirit of my invention, as, for example, a solid body may be used of the buoyant type and I may, in some instances, utilize natural bait in connection with the device, it being apparent that, while I have shown a pair of hooks in carrying out my invention, I may utilize one hook under spring control or two or more of such hooks.

With the above objects in view the invention consists in certain peculiarities of construction and combination of parts as set forth hereinafter with reference to the accompanying drawings and subsequently claimed.

Figure 1:
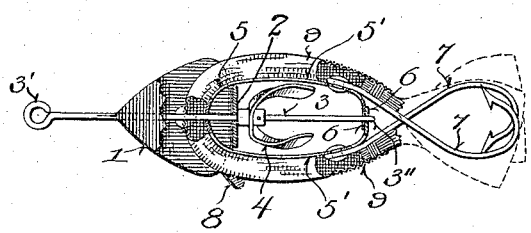
Figure 2:
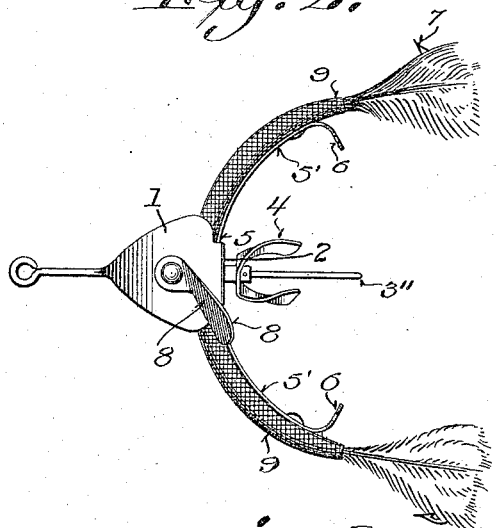

In the drawings Figure 1 represents a side elevation of a device embodying the features of my invention with parts broken away and in section to more clearly show certain details of construction, the spring-controlled hooks being illustrated in their closed or locked position for trolling; Fig. 2, a similar view showing the hooks released and in their working or gaffing position, and Fig. 3 illustrates a solid form of body which may be, in some instances, utilized in connection with the skeleton form shown in Figs. 1 and 2.

Referring by characters to the drawings, there is provided a head composed of cheek-pieces 1 and a connecting neck-plate 2. This head comprises a single plate of metallic material bent centrally upon itself to form the parts named. Extending through an aperture in the neck-plate and lying between the cheek piece is a body-pin 3, which body-pin projects beyond the head and terminates with a line attaching eye 3'. The body-pin just rearward of the neck 2 has revolubly mounted thereon a whirl or spoon 4, as shown in Figs. 1 and 2.

Figure 3:
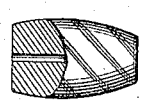

It is obvious that I may, in some instances, substitute for the whirl or spoon a solid body 4', such, for example, as is shown in Fig. 3 of the drawings, the body being centrally apertured and adapted to fit upon the body-pin and be secured in any desired manner.

Mounted upon the body-pin 3 within the head is a flat bow-spring 5, which spring extends in opposite directions to form jaws 5', 5', and the free ends thereof terminate with inwardly projecting apertured lateral ears 6. The said bow-spring members, as shown, extend rearwardly of the body and adjacent to their rear ends each of the same has secured thereto a hook 7. These hooks are shown preferably concealed by feathers or other suitable devices to attract the fish, it being understood that the hooks in themselves form no part of my invention, except so far as that they are spring-controlled due to their connection with the jaw-members 5'.

The outer faces of the head are provided, as best shown in Fig. 2, with adjustable fins 8, which fins may be set at any desired predetermined angle, whereby the minnow or bait as a whole may be caused to travel upon the top or under the water as conditions may require.

As shown in Fig. 2, the spring jaw members are in their normal positions and, in order to set the hooks preparatory to the bait being used, the said jaw members are bowed downwardly in such position as to permit the apertured ears 6 thereof being slipped over the free end 3″ of the body-pin, which pin thus constitutes a locking mechanism for the jaws due to the fact that the bowing of the jaws tends to draw their ear carrying ends toward the head. The spring-controlled hook members being thus locked the hooks of each of said members is folded one upon the other to protect or conceal the points, as best shown in Fig. 2. Thus the device, when locked, assumes the form of a skeleton minnow.

As shown in Figs. 1 and 2, I provide flexible shield braids 9 for the spring jaws 5′, which shields are secured in any suitable manner to the jaws to present a life-like appearance of a bait in the form of a worm thereto, the said shields also, due to their flexibilty, permitting a yielding bite upon the device. By this bowed arrangement taken in connection with the yielding qualities of the hook-carrying members it will be obvious that, even though the fish should grasp the body of the bait, the hooks would be instantly released. This is due to the fact that compression of the springs will take place in both directions, insuring release of the locking mechanism. Hence the bait will be effective whether the fish grasps the hook ends and draws backwardly or grips the bait bodily.

It is obvious from the foregoing description that should the minnow be grabbed by a fish, when the jaws of the fish exert a positive pressure upon the shanks of the hooks or the bow-springs, the said bow-springs will be compressed to thus cause their apertured ears to recede or strip from the locking point of the body-pin, whereby said hooks are released and the spring jaws will thus snap outwardly to the position shown in Fig. 2, causing the fish to be gaffed within the mouth at two points, the spring exerting sufficient force to embed the points of the hooks into the flesh of the fish so securely that it is practically impossible for the caught fish to be released by tearing or shaking the bait from its mouth.

It is also within the scope of my invention to utilize the body-pin as a support for any style of natural bait or the device may be used in connection with frogs or the like.

I claim:

A fish bait comprising a head having a rod extending longitudinally therethrough, the ends of the rod projecting beyond the ends of the head, the outer end of the rod being provided with fish-line engaging means, a bowed spring extending through the head, the arch of said spring being mounted on the rod within the head, the free ends of the spring being provided with fish-engaging means and adjacent said ends the spring being provided with inwardly projecting ears provided with openings for engaging the inner end portion of the rod, the ears and the inner end of the rod being so disposed whereby a compressing pressure applied to the free portions of said spring will cause the ears to slide from engagement with the rod.

In testimony that I claim the foregoing I have hereunto set my hand at Milwaukee in the county of Milwaukee and State of Wisconsin in the presence of two witnesses.

WILLIAM G. BLODGETT.

Witnesses:
GEO. W. YOUNG,
M. E. DOWNEY.